March 26, 1935. J. L. BAIRLEY 1,995,289

CLAMP FOR CABLES, WIRES, ROPES, AND THE LIKE

Filed May 15, 1933

INVENTOR.
JOHN L. BAIRLEY
BY
ATTORNEY

Patented Mar. 26, 1935

1,995,289

UNITED STATES PATENT OFFICE 1,995,289

CLAMP FOR CABLES, WIRES, ROPES, AND THE LIKE

John L. Bairley, Berkeley, Calif.

Application May 15, 1933, Serial No. 671,021

2 Claims. (Cl. 24—126)

This invention relates particularly to a clamp for clamping one end of a cable, wire or rope onto an adjacent portion of the said cable, wire or rope, to form an eyelet, or for clamping the ends of contiguous cables, wires or ropes together into axial alignment.

An object of the invention is to provide a clamp for cables, wires, ropes and the like, by means of which two strands of the cable, wire, or rope may be clamped together against axial dislodgment, whereby any force tending to axially separate the two strands will have the effect of causing the clamp to increase the application of frictional resistance as well as compressive action on the said strands.

A further object of the invention is to provide a two part clamp for holding a pair of cables, wires, ropes or the like, together, so that one of the cables, wires, ropes or the like, may not move axially relative to the other, which, said clamp, may readily be loosened to free the clamp parts.

A still further object of the invention is to provide a clamp to be used in clamping or securing a pair of cables, wires or ropes together, which clamp is of the automatic self-locking type, wherein the pressure exerted by the clamp on the parts to be clamped together is directly proportionate to the force or pull tending to axially dislodge the clamp members.

Other objects and advantages are to provide a clamp for cables, wires, ropes and the like that will be superior in point of simplicity, inexpensiveness of construction, positiveness of operation, and facility and convenience in use and general efficiency.

In this specification and the annexed drawing, the invention is illustrated in the form considered to be the best, but it is to be understood that the invention is not limited to such form, because it may be embodied in other forms; and it is also to be understood that in and by the claims following the description, it is desired to cover the invention in whatsoever form it may be embodied.

Figure 1:
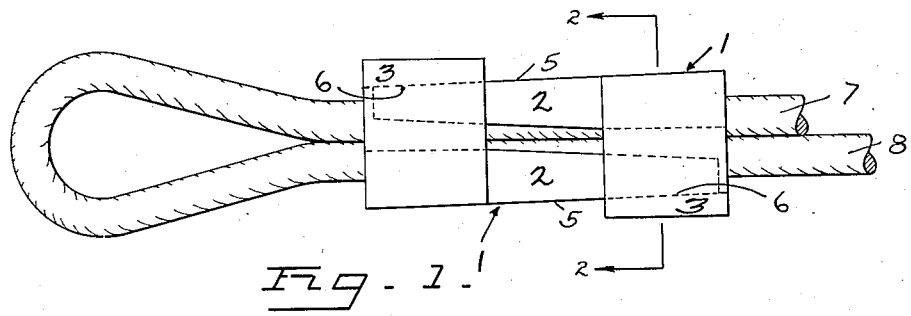
Fig. 1 is a side elevation of an automatic self-locking clamp constructed in accordance with my invention, and illustrating the application thereof in clamping position on a pair of circular strands.

In detail the construction illustrated in the drawing comprises a pair of clamping members 1—1, both of which are exactly alike as to size, shape and configuration. Each clamp member consists of an elongated, tapered tongue piece 2, having a cowl housing or saddle 3 projected outwardly on one side of an end thereof. A groove or channel 4 is provided on the upper face of the tongue 2, which groove or channel extends lengthwise of the tongue piece and through that portion of the tongue which is confined within the housing 3.

The under or bottom face 5 of the tongue piece 2 is tapered and does not lie parallel with the upper surface of the tongue piece. The interior of the upper side of the housing 3 is tapered as at 6. In order to hold two strands of a cable, wire, or rope together by means of the clamp constructed in accordance with my invention, the two strands of the members to be clamped together are inserted through the housings or saddles 3 in each of the members 1—1. One of said members is placed in an upside down and reversed position relative to the other, whereby the tapered bottom faces 5 of each of the tongue pieces will engage the tapered inside portion 6 on the housing of the other member. The grooved inner faces of each of the tongue pieces engage the outer circumference of the strands 7 and 8 to hold the said strands in superposed position.

When the clamp members 1—1 are engaged in the position shown in Fig. 1, they are initially engaged with the strands 7 and 8 by driving the tongue piece 3 on the respective clamps toward each other, the tapered engaging surfaces on the tongue pieces and housings serving to move the inner parallel faces of the tongue pieces closer together, and thereby tightly clamping the strands 7 and 8. Any force tending to pull the strands 7 and 8 axially apart, would have the effect of more tightly pulling the tongue pieces 2 into clamping engagement, on account of the frictional resistance resulting between the contact of the strands 7 and 8 with the inner faces of the tongue pieces. When the two clamps 1—1 are engaged in the manner shown in Fig. 1, the degree of clamping resistance to be exerted on the strands 7 and 8 by the tongue pieces of the clamp, is directly proportional to the force or pull tending to axially dislodge the said strands. The action of the two clamping members to engage with the strands 7 and 8 is automatic and self-locking in character, yet two parts of the clamp may be readily disengaged in order to free the strands 7 and 8 from the clamp.

Figure 2:
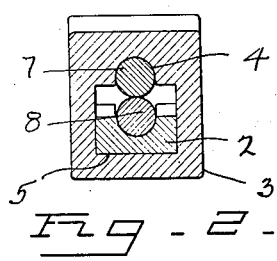
Fig. 2 is an end elevation of Fig. 1.
Figure 3:
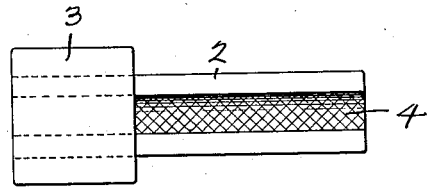
Fig. 3 is a plan view of one of the clamping members shown in Fig. 1.
Figure 4:
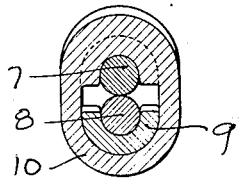
Fig. 4 is an end view of a modified form of clamping device, wherein the ends of the same are rounded.

In the form of clamping device shown in Figs. 1, 2 and 3, I have provided the tongue 2 with a substantially rectangular cross section, and I have also provided a housing or saddle 3 with a corresponding cross section. In the form of device shown in Fig. 4, I have provided a tongue piece 9 and a housing or saddle 10, both of which have a circular cross section. In either the preferred or modified forms of the device, the method of operation is precisely the same.

Figure 5:
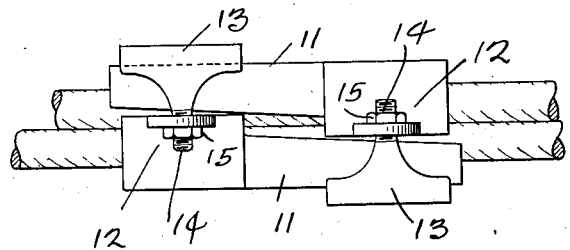
Fig. 5 is a side elevation of a still further modified form of clamp.

In the modified form of clamp shown in Fig. 5, I have provided a tapered tongue piece 11 having a pair of projections 12 on opposite sides thereof. A saddle 13 is arranged on one side of the tongue 11, the saddle 13 having a pair of threaded studs 14 extended downwardly on opposite sides thereof, into the threaded projections 12, and are there engaged by lock nuts 15 to prevent dislodgment therefrom.

The inner faces of the tongue pieces 11 are grooved or channeled to receive the strands of the material to be held. The form of the device shown in Fig. 5, has the saddle 13 adjustably mounted on the tongue 11 to more readily adapt the clamp to different diameters of cables, wires or ropes. The method of clamping two cables, wires, or ropes together by means of the clamp shown in Fig. 5, is exactly the same as that shown in connection with the operation of the device shown in Figs. 1, 2 and 3 inclusive. The structure shown in Fig. 5, also embodies an additional feature, to wit, after two strands have been clamped together, the lock nuts 15 may be turned to additionally compress the two strands 7 and 8 together.

Having thus described this invention, what I claim and desire to secure by Letters Patent is:

1. A rope clamp comprising a pair of matching members, each being grooved lengthwise on one side thereof to receive the rope to be clamped, and tapered on the opposite side thereof, a housing extended out on the grooved side of each member at one end thereof, said housing being opened lengthwise of the member to receive the other end of the other member, whereby the engagement of the tapered side of each member with the respective housings causes said members to move toward each other when axially advanced relative to each other; and means to adjust the position of the housing relative to the grooved face of the member.

2. A clamp of the character described, comprising a pair of like members each having a longitudinally disposed groove in the interior thereof, said members being spaced from each other and adapted when in operative relationship to mutually form a longitudinal parallel and transversely elliptical seat for the overlapping ends of a pair of cables, ropes or the like, each member having the exterior thereof tapered longitudinally; and an unbroken hollow housing projected outwardly on the grooved side of each member adjacent an end thereof, the interior of each housing being tapered, to receive the tapered exterior of the other member and operating when said members are advanced axially toward each other to decrease the area of the elliptical seat and to increase the area of said elliptical seat when the members are withdrawn axially from each other.

JOHN L. BAIRLEY.